US009684983B2

(12) United States Patent
Bartley et al.

(10) Patent No.: US 9,684,983 B2
(45) Date of Patent: Jun. 20, 2017

(54) THREE DIMENSIONAL VISUALIZATION OF BIG DATA (71) Applicant: International Business Machines Corporation, Armonk, NY (US)

(72) Inventors: Timothy S. Bartley, Worongary (AU); Gavin G. Bray, Robina (AU); Elizabeth M. Hughes, Currumbin Valley (AU); Kalvinder P. Singh, Miami (AU)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/265,724

(22) Filed: Apr. 30, 2014

(65) Prior Publication Data
US 2015/0317807 A1 Nov. 5, 2015

(51) Int. Cl.
*G06T 11/20* (2006.01)
*G06T 15/00* (2011.01)

(52) U.S. Cl.
CPC ............ *G06T 11/206* (2013.01); *G06T 15/00* (2013.01)

(58) Field of Classification Search
None
See application file for complete search history.

(56) References Cited

U.S. PATENT DOCUMENTS

| 5,491,779 | A | 2/1996 | Bezjian |
| 6,104,400 | A | 8/2000 | Halachmi et al. |
| 6,266,805 | B1 | 7/2001 | Nwana et al. |
| 6,320,586 | B1 | 11/2001 | Plattner et al. |
| 6,499,026 | B1 | 12/2002 | Rivette et al. |
| 6,897,885 | B1 | 5/2005 | Hao et al. |
| 7,143,392 | B2 | 11/2006 | Ii et al. |
| 7,356,770 | B1 * | 4/2008 | Jackson ................ G06F 9/5072 715/735 |
| 2003/0216971 | A1 * | 11/2003 | Sick ........................ G01D 4/004 705/7.36 |
| 2010/0042447 | A1 * | 2/2010 | Cantor .................. G06T 11/206 705/35 |
| 2010/0253686 | A1 * | 10/2010 | Alsbury ................ G06T 11/206 345/440 |

(Continued)

OTHER PUBLICATIONS

Drew Skau, How Groups Stack Up: When to Use Grouped vs. Stacked Column Charts, 2012, retrieved from <<http://blog.visual.ly/how-groups-stack-up-when-to-use-grouped-vs-stacked-column-charts/>>, accessed Dec. 14, 2015.*

(Continued)

*Primary Examiner* — Michael J Cobb
(74) *Attorney, Agent, or Firm* — Brian M. Restauro; Alexa L. Ashworth (57) ABSTRACT

A method for visualization of big data using three dimensional pie charts. The method includes receiving at least a first set of data, comprising information detailing one or more subsets of values, each value having an associated time element. The method includes determining a three dimensional pie chart based on the at least first set of data, which includes at least as first layer comprising a first set of wedges and a second layer comprising a second set of wedges. The method includes displaying the three dimensional pie chart comprising at least the first layer and the second layer.

6 Claims, 6 Drawing Sheets

EXEMPLARY 3-D PIE CHART REPRESENTING INTERPOLATION OF MISSING DATA

(56) References Cited

U.S. PATENT DOCUMENTS

| | | | | |
|---|---|---|---|---|
| 2010/0321391 A1* | 12/2010 | Rubin | ................... | G06T 11/206 345/441 |
| 2011/0115795 A1* | 5/2011 | Koch | ..................... | G06T 11/20 345/440 |
| 2011/0202442 A1* | 8/2011 | Rabstejnek | ............ | G06Q 10/06 705/34 |
| 2012/0191432 A1* | 7/2012 | Khataniar | ............... | E21B 43/00 703/10 |
| 2014/0139642 A1* | 5/2014 | Ni | ........................... | H04N 9/09 348/48 |
| 2015/0051462 A1* | 2/2015 | Olsen | ................. | A61B 5/14542 600/323 |

OTHER PUBLICATIONS

Oracle, Tutorial: Oracle BAM—Create a Stacked Bar Chart, 2009, retrieved from http://www.oracle.com/technetwork/middleware/bam/bamsample-stackedbarchart-130964.pdf, accessed Dec. 14, 2015.*

StackOverflow, asp.net Charting Control Transparency, 2010, retrieved from <<http://stackoverflow.com/questions/2465230/asp-net-charting-control-transparency>>, accessed on May 4, 2016.*

Engineering 360: CR4—The Engineer's Place for News and Discussion, PIE Chart, 2012, retrieved from <<http://cr4.globalspec.com/thread/81385/PIE-Chart>>, accessed on May 4, 2016.*

Booker, Ellis, "How Data Visualization Experts See the Future", Big Data // Big Data Analytics, InformationWeek, Sep. 9, 2013, 11:53 AM, <http://www.informationweek.com/big-data/big-data-analytics/how-data-visualization-experts-see-the-future/d/d-id/1111462>.

Brody, Paul, "Research Preview: 3D Printing Goes Exponential", Insights on business, Mar. 18, 2013, 11:38 am, <http://insights-on-business.com/electronics/research-preview-3d-printing-goes-exponential/>.

Cherry, Steven, "A 3-D Printer for Human Embryonic Stem Cells", posted Apr. 2, 2013, 15:45 GMT, IEEE Spectrum, "Techwise Conversations", <http://spectrum.ieee.org/podcast/biomedical/devices/a-3d-printer-for-human-embryonic-stem-cells>.

D'Aveni, Richard A., "3-D Printing Will Change the World", Harvard Business Review, The Magazine, Mar. 2013, <http://hbr.org/2013/03/3-d-printing-will-change-the-world/>.

Faktor, Steve, "How HP Could Reinvent 3D Printing . . . and Itself", Forbes.com, Oct. 15, 2012 @ 9:40AM, <http://www.forbes.com/sites/stevefaktor/2012/10/15/how-hp-could-reinvent-3d-printing-and-itself/>.

Messmer, Ellen, "Gartner: 64% of organizations looking at Big Data projects this year", Network World, Sep. 23, 2013 12:08 PM ET, <http://www.networkworld.com/news/2013/092313-gartner-big-data-274085.html>.

Milang, "Stair-Stacked Pie Chart", Better Dashboards, Posted by milang on Jan. 9, 2009, <http://betterdashboards.wordpress.com/2009/01/09/stair-stacked-pie-chart/>.

Park, Rachel "3D Printing has Reached the Upper Echelons of US Politics—2013 State of the Union Address", 3D Printing Industry, Wed, Feb. 13, 2013—3D Printing, Industry news, North America, <http://3dprintingindustry.com/2013/02/13/3d-printing-has-reached-the-upper-echelons-of-us-politics-2013-state-of-the-union-address/>.

Savitz, Eric, "Manufacturing the Future: 10 Trends to Come in 3D Printing", CIO Network, Forbes.com, Dec. 7, 2012 @ 10:29AM, <http://www.forbes.com/sites/ciocentral/2012/12/07/manufacturing-the-future-10-trends-to-come-in-3d-printing/>.

Sharwood, Simon, "Data visualization: Big Data's hot cousin", The Register, Apr. 26, 2012, <http://www.theregister.co.uk/2012/04/26/data_visualization/>.

"Advanced visualization", IBM Software, Business Analytics, provided by inventor in main idea on Dec. 10, 2013, <http://www-01.ibm.com/software/analytics/many-eyes/>.

"Big Data", Technology Research, Gartner Inc., © 2014 Gartner, Inc. and/or its Affiliates, <http://www.gartner.com/technology/topics/big-data.jsp>.

"Driving Value from Big Data", Investing in Information and Analytics, Gartner Inc., © 2014 Gartner, Inc. and/or its Affiliates, <http://www.gartner.com/technology/research/big-data/>.

"Gartner Identifies the Top 10 Strategic Technology Trends for 2014", Analysts Examine Top Industry Trends at Gartner Symposium/ITxpo Oct. 6-10, 2013 in Orlando, Orlando, Fla., Oct. 8, 2013, Gartner Inc., © 2014 Gartner, Inc. and/or its Affiliates,<http://www.gartner.com/newsroonn/id/2603623>.

Global Big Data Market—Size, Share, Forecast, Segments, Opportunity, Report 2012—2018, Albany, New York (PRWEB) Jul. 10, 2013, Online Visibility from Vocus, © Copyright 1997-2014, Vocus PRW Holdings, LLC., <http://www.prweb.com/releases/2013/7/prweb10905352.htm>.

"List of 3D films", Wikipedia, the free encyclopedia, this page was last modified on Mar. 7, 2014 at 17:30,<http://en.wikipedia.org/wiki/List_of_3D_films>.

"Watson is transforming customer service", Watson, IBM, provided by inventor in main idea on Dec. 10, 2013, <http://www-03.ibm.com/innovation/us/watson/>.

"Welcome to Apache™ Hadoop®!", Hadoop, Last Published: Mar. 4, 2014 13:44:52, Copyright © 2012 The Apache Software Foundation, <http://hadoop.apache.org/>.

"What is Big Data?", Big Data, IBM, A Smarter Planet, provided by inventor in main idea on Dec. 10, 2013, <http://www.ibm.com/big-data/us/en/>.

* cited by examiner

```
#!/bin/bash
gawk '
BEGIN { i = 0 }

{
   if ($0 !~ /#/) {
   label[i] = $1
   planes = NF - 1;

n = 2;
   p = 0;
   while (n <= NF) {
      v[p,i] = $n
      D[p] += $n
      ++n
      ++p
   }
   ++i
   }
}

END { print "reset"
   print "a=6; B=0.5; r=1.0; s=0.1"
   print "set view 30, 20; set parametric"
   print "unset border; unset tics; unset key; unset colorbox"
   print "set ticslevel 0"
   print "set urange [0:1]; set vrange [0:1]"
   print "set xrange [-2:2]; set yrange [-2:2]; set zrange [0:20]"
   print "set multiplot"
   print "set palette model RGB functions 0.9, 0.9,0.95"

printf "splot -2+4*u, -2+4*v, 0 w pm3d\n"

for (p = 0; p < planes; p++) {
   printf "h = s + a*%g\n", p d = 0.0;
   for (j = 0; j < i; j++) {
      printf "set palette model RGB functions %g, %g, %g\n", (j%3+1)/3, (j%6+1)/6, (j%9+1)/9
      printf "set urange [%g:%g]\n", d, d+v[p,j]/D[p]
      printf "splot cos(u*2*pi)*r, sin(u*2*pi)*r, h+v*a w pm3d\n"

d += v[p,j]/D[p]
   } d=0.0;
   for (j = 0; j < i; j++) {
      printf "set palette model RGB functions %g, %g, %g\n", (j % 3 + 1)/3, (j % 6 + 1)/6, (j % 9 + 1)/9
      printf "set urange [%g:%g]\n", d, d+v[p,j]/D[p]
      printf "splot cos(u*2*pi)*r*v, sin(u*2*pi)*r*v, h+a w pm3d\n"

d += v[p,j]/D[p]
   } if (p == planes - 1) {
      d = v[p,0]/D[p];
      for (j = 0; j < i; j++) {
      printf "set label %d \"%s\" at cos(%g*pi)*B+cos(%g*pi), sin(%g*pi)*B+sin(%g*pi),a+h centre \n", j+1, label[j], d, d, d, d
      d = d + v[p,j]/D[p] + v[p,j+1]/D[p]
      }
   } printf "set palette model RGB functions %g, %g, %g\n", ((i - 1) % 3 + 1)/3, ((i - 1) % 6 + 1)/6, ((i - 1) % 9 + 1)/9
   printf "set urange [%g:1]\n", 1.0 - v[p,i-1]/D[p]
   printf "splot cos(u*2*pi)*v, sin(u*2*pi)*v, a+h w pm3d\n"
   }
   printf "unset multiplot\n"
}' $1
```

THREE DIMENSIONAL VISUALIZATION OF BIG DATA

FIELD OF THE INVENTION

The present invention relates generally to the field of visualization of data, and more particularly to visualization of big data using three dimensional representations.

BACKGROUND

Big data, or large, complex sets of data that are difficult to process using traditional data processing applications, and three dimensional (3-D) representations are expanding areas, increasing the value in efficient ways to visualize the data. Good data visualization allows non-experts to understand and interpret the meaning behind a set of given data. Good visualization techniques pick out the critical information and put it in a consumer-friendly model. Bar graphs, line graphs, scatter plots, and pie charts are each ways to visually represent sets of data.

A pie chart is a circular chart divided into sectors, illustrating numerical proportion. The arc length of each sector is proportional to the quantity it represents. Pie charts are used to concisely represent the relative proportion of a set of values across various categories. Programs, such as EXCEL and gnuplot, can create pie charts, as well as 3-D pie charts.

SUMMARY

Embodiments of the present invention disclose a method, computer program product, and computer system for visualization of big data using three dimensional pie charts. A computing device receives at least a first set of data comprising information detailing one or more subsets of values, each value having an associated time element. The computing device determines a three dimensional pie chart based on the at least first set of data, which includes at least a first layer comprising a first set of wedges, and a second layer comprising a second set of wedges. The computing device displays the three dimensional pie chart comprising at least the first layer and the second layer.

BRIEF DESCRIPTION OF THE SEVERAL VIEWS OF THE DRAWINGS

FIG. 3A illustrates an example of the text of an input code, written in gnuplot programming language, for generating the 3-D pie chart of FIG. 3B, in accordance with an embodiment of the present invention.

DETAILED DESCRIPTION

A pie chart is a useful tool to assist in the visualization of data. Better visualization of data can improve understanding of the data, and may allow the data to be more accessible to all users. Embodiments of the present invention seek to provide a method for visualizing a change in data over time, using three axes in one representation, in the form of a 3-D pie chart.

Figure 1:
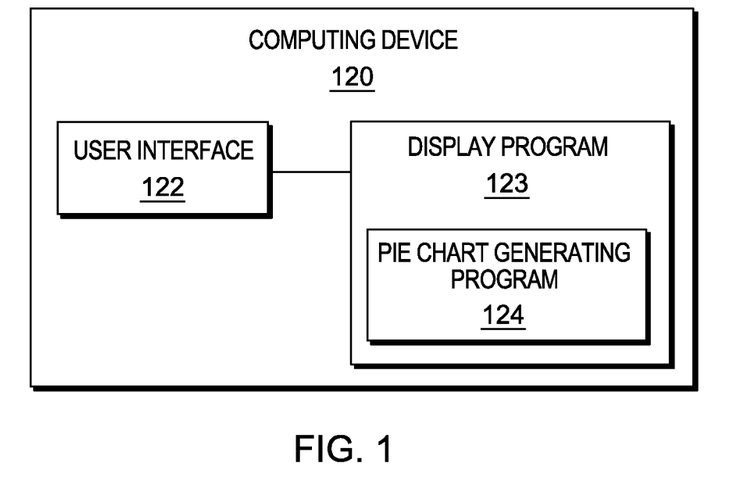
FIG. 1 is a functional block diagram illustrating a computing device, in accordance with an embodiment of the present invention.

The present invention will now be described in detail with reference to the Figures. FIG. 1 is a functional block diagram illustrating a computing device, designated 120, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, computing device 120 can be a laptop computer, a tablet computer, a netbook computer, a personal computer (PC), a desktop computer, a personal digital assistant (PDA), a smart phone, or any programmable electronic device capable of executing computer readable program instructions. Computing device 120 can be a server, including a management server, a web server, or any other electronic device or computing system capable of receiving and sending data.

Computing device 120 includes user interface (UI) 122, display program 123, and pie chart generating program 124. In an exemplary embodiment of the present invention, display program 123 and pie chart generating program 124 are included within one program. In other embodiments, display program 123 and pie chart generating program 124 are separate programs included within one or more computing devices, and interact via a network. Computing device 120 may include internal and external components, as depicted and described in further detail with respect to FIG. 4.

In the exemplary embodiment, UI 122 is a graphical user interface (GUI) or a web user interface (WUI), and can display text, documents, web browser windows, user options, application interfaces, and instructions for operation. UI 122 is capable of receiving data, user commands, and data input modifications from a user. UI 122 is also capable of communicating with display program 123 and/or pie chart generating program 124. UI 122 is capable of displaying the output from the execution of pie chart generating program 124.

In the exemplary embodiment, display program 123 is capable of communicating with UI 122. Display program 123 and pie chart generating program 124 are capable of interacting via a network when embodied as separate programs, or located on separate computing devices. Display program 123 is capable of receiving input data for three different dimensions from UI 122 and/or pie chart generating program 124 and mapping and displaying the input data as a 3-D pie chart, visually representing the input data in three dimensions.

In the exemplary embodiment, pie chart generating program 124 is capable of communicating with UI 122 and display program 123. Pie chart generating program 124 is capable of interacting with display program 123 via a network when embodied as separate programs, or when located on separate computing devices. Pie chart generating program 124 is capable of receiving input data for three different dimensions from UI 122, executing the input data as computer readable code, and displaying the results in three dimensions as a 3-D pie chart, via UI 122 and/or display program 123.

Figure 2:
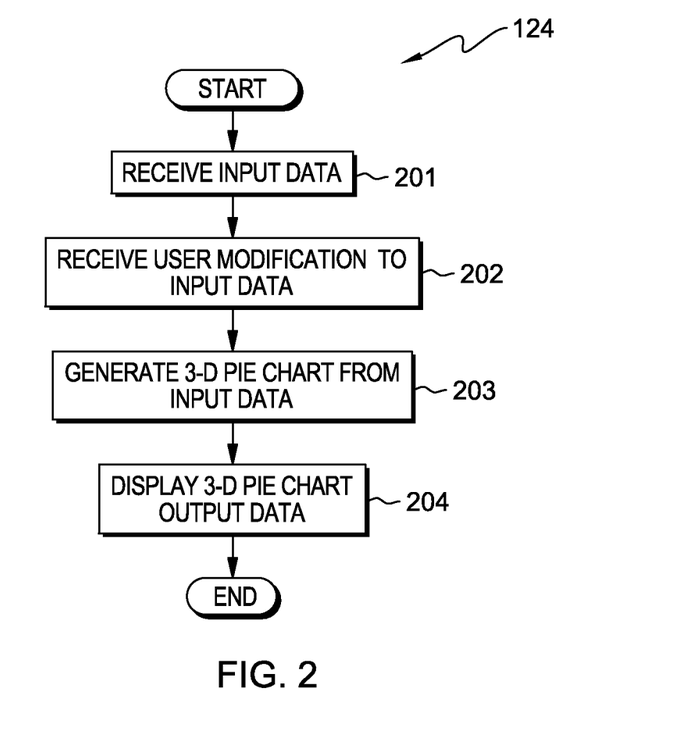
FIG. 2 is a flowchart depicting operational steps of a pie chart generating program for generating a 3-D pie chart using input data, in accordance with an embodiment of the present invention.

FIG. 2 is a flowchart depicting operational steps of pie chart generating program 124 for generating a 3-D pie chart using input data, in accordance with an embodiment of the present invention.

Pie chart generating program 124 receives input data (step 201). In the exemplary embodiment, pie chart generating program 124 receives data from display program 123, input by a user of computing device 120. The input data are sets of data capable of being converted into a computer code, which can be visually represented in three dimensions, the third dimension representing an additional axis, e.g., time data. For example, pie chart generating program 124 may receive data that changes over a period of time, input to a computer code from a user of computing device 120, via gnuplot, a command-line driven graphing program that can generate 3-D plots of data. In another embodiment, responsive to a request by a user, pie chart generating program 124 retrieves the desired data from an outside database, via a network. In yet another embodiment, pie chart generating program 124 receives, via a network, a set of data as it is generated, through a real-time stream of data. For example, pie chart generating program 124 may receive current revenue data for a company, via a network, as it is being updated in real time.

In the exemplary embodiment, pie chart generating program 124 reads in the data files containing the desired data to be graphed into a 3-D pie chart, in a comma separated value (CSV) file, which stores numbers and text in a plain-text format. In other embodiments, pie chart generating program 124 reads in the received data files, written in any suitable format. For example, pie chart generating program 124 can read-in a data file formatted as an XML file, a text file, an EXCEL file, and/or directly from a database via a network, among other formats.

Pie chart generating program 124 receives a modification to the input data, from a user (step 202). In the exemplary embodiment, supplemental code, written in any corresponding programming language, is appended by a user of computing device 120 to the computer code receiving the input data in step 201, using pie chart generating program 124, in order to change the appearance of the 3-D pie chart visual representation. For example, a user may append additional code written in gnuplot programming language that changes one or more of: the height of one or more layers (described in FIG. 3C); the diameter of one or more layers (described in FIG. 3D); and/or interpolates missing data into one or more layers (described in FIG. 3E). In another embodiment, the modification indicates a suitable range of data to represent in the third dimension of the pie chart. For example, a user may choose to limit the range of time in the third dimension to ten years, to make the output data represented in the 3-D pie chart easier to visualize for other users.

Figure 3B:
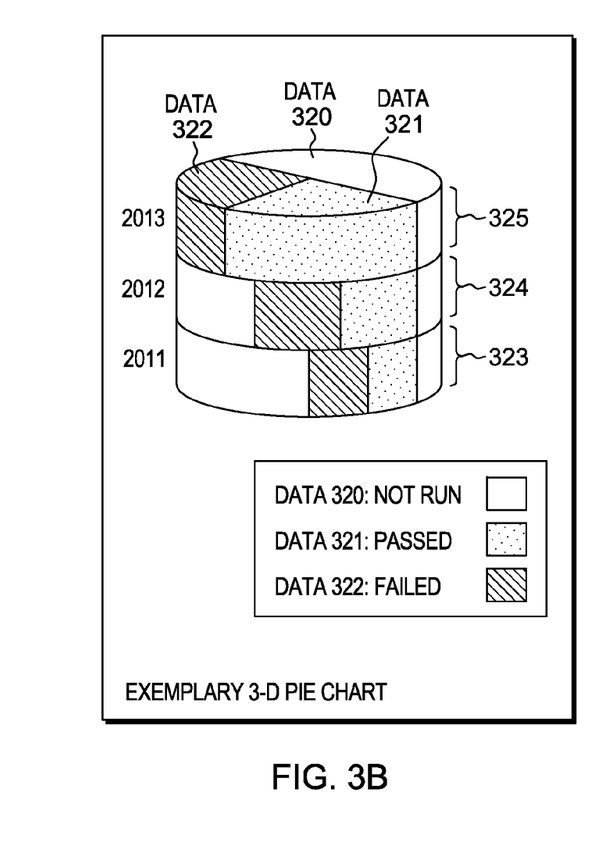
FIG. 3B illustrates an example of a layered 3-D pie chart with 3 sets of data represented, generated from the example input code of FIG. 3A, in accordance with an embodiment of the present invention.

Pie chart generating program 124 generates a 3-D pie chart from the input data (step 203). In the exemplary embodiment, pie chart generating program 124 executes the computer code, which includes data input by a user of computing device 120, and display program 123 generates a 3-D pie chart from the computer code. For example, the 3-D pie chart in FIG. 3B is generated by the gnuplot graphing program, from the gnuplot language computer code of FIG. 3A (discussed below). In other embodiments, pie chart generating program 124 executes the input computer code and any supplemental code appended by a user written in any suitable programming language, and generates the output as a data file containing the information to generate a 3-D pie chart from the input data, and is capable of being input directly into various sources.

Pie chart generating program 124 displays the pie chart data (step 204). In the exemplary embodiment, pie chart generating program 124 directly outputs the resulting data from the generation of the 3-D pie chart to display program 123, which visually represents the 3-D pie chart. For example, pie chart generating program 124 may output the resulting data from the generation of the 3-D pie chart to the gnuplot graphing program, which is capable of displaying the output data on a screen as an interactive 3-D pie chart. A user of computing device 120 may subsequently manipulate the generated 3-D pie chart, for example, zooming in on particular areas of the 3-D pie chart in the display program. In other examples, the gnuplot graphing program may output the resulting data as a static screen display, a direct output to a file, such as a Portable Network Graphics (PNG) and a Scalable Vector Graphic (SVG), and/or in a mouseable web display format, such as HTML5.

In another embodiment, pie chart generating program 124 outputs the executed computer code for generating a 3-D pie chart in a file format, and the file can be input into various display programs. For example, pie chart generating program 124 may output the executed computer code as a graphics file, such as a PDF, Graphics Interchange Format (GIF), and/or a JPEG, among other file formats, which may later be retrieved and input into a display program, such as display program 123. In other embodiments, pie chart generating program 124 outputs the generated code in a file format, and the generated code file is converted to a 3-D printer compatible file allowing the output to be 3-D printed, displaying the output results as a physical 3-D pie chart.

FIG. 3A illustrates an example of the text of an input code, written in the gnuplot graphing program, for generating the 3-D pie chart of FIG. 3B. The gnuplot program is a command-line graphing program, and is capable of being executed on most computing devices and operating systems. For example, the command "set urange [0:1]; set vrange [0:1]" sets the surface parametric ranges, while the command "set xrange [−2:2]; set yrange [−2:2]; set zrange [0:20]" sets the desired horizontal and vertical ranges of the function to be plotted.

FIG. 3B illustrates an example of a layered 3-D pie chart with three sets of data represented, generated from the example input code of FIG. 3A, in accordance with an embodiment of the present invention. Data 320, data 321, and data 322 are each sets of different exemplary data, showing the pass and failure rates of all planned test cases, as well as the number of test cases yet to be run. 3-D pie chart layers 323, 324, and 325 are each the same height, and each represents the data from the years 2011, 2012, and 2013, respectively. For example, in pie chart layer 325 (year 2013), data 320 represents 50% of layer 325, the number of planned test cases not yet run, data 321 represents 25% of layer 325, the number of test cases that passed, and data 322 represents 25% of layer 325, the number of test cases that failed. As depicted in FIG. 3B, data 320, the number of cases not yet run, decreases in percentage of the total pie layer represented over the span of years from 2011 to 2013 (layer 323 through layer 325). Data 321 (number of passed test cases) and data 322 (number of failed test cases) both increase in percentage of the total pie layer represented over the span of years from 2011 to 2013 (layer 323 through layer 325).

Figure 3C:
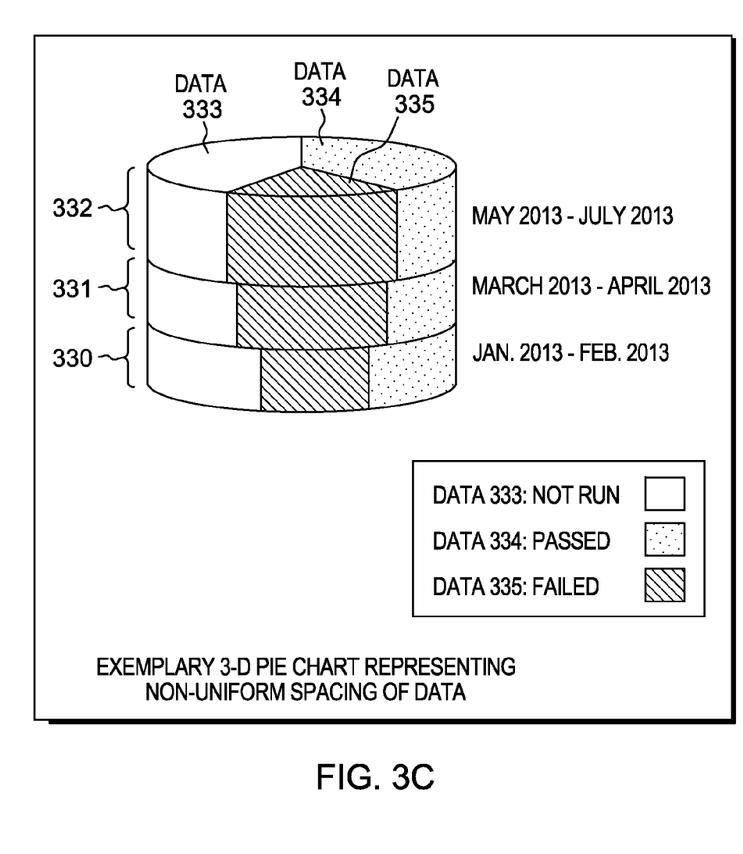
FIG. 3C illustrates an example of a 3-D pie chart in which the height of each layer represents the non-uniform spacing of the data in the additional (third) axis, in accordance with an embodiment of the present invention.

FIG. 3C illustrates an example of a 3-D pie chart in which the height of each layer represents the non-uniform spacing of data in the additional axis, representing time, in accordance with an embodiment of the present invention. 3-D pie chart layers 330, 331, and 332 each represent one layer of the 3-D pie chart, and each represents time data compiled from January 2013 through February 2013, March 2013 through April 2013, and May 2013 through July 2013, respectively. Data 333, 334, and 335 are each exemplary sets of data represented in each 3-D pie chart layer 330, 331, and 332, showing the pass and failure rates of all planned test cases, as well as the number of test cases yet to be run. The height of layers 330 and 331 are equal, as each represents the same range of time data (2 months). The height of layer 332 is 1½ times the height of both layers 330 and 331, as layer 332 represents time data from 1½ times (3 months) the range of time as layers 330 and 331.

Figure 3D:
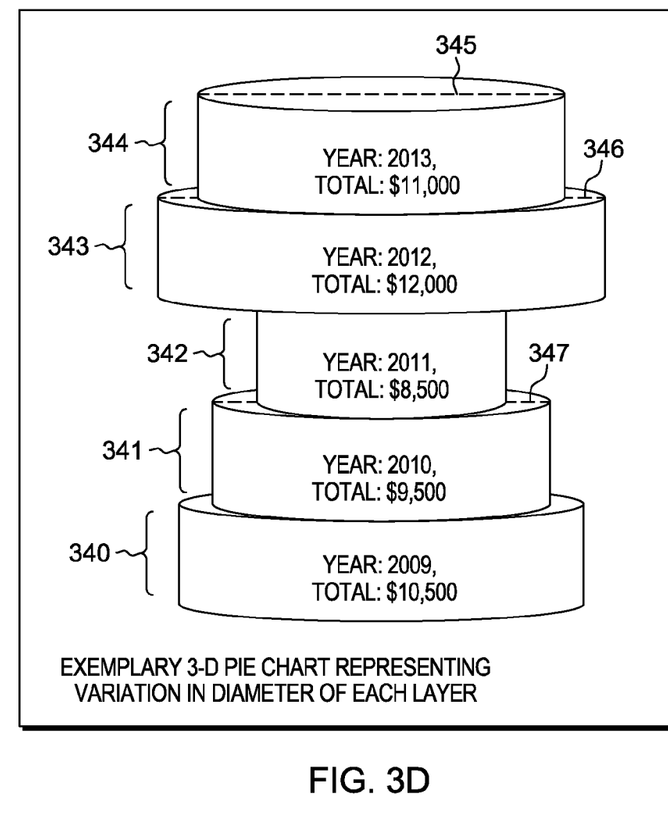
FIG. 3D illustrates an example of a 3-D pie chart in which the variation of the diameter of a layer represents variation in the overall total value represented by the layer, in accordance with an embodiment of the present invention.

FIG. 3D illustrates an example of a 3-D pie chart in which the total revenue of a year is proportionately represented by the size of the diameter of the layer, in accordance with an embodiment of the present invention. 3-D pie chart layers 340, 341, 342, 343, and 344 are each the same height, and each layer represents a relative change over time of the overall revenue for the year. For example, a change in the diameter of a layer may represent a change (increase or decrease) in the total revenue between years. As depicted in FIG. 3D, diameter 345 of layer 344 (year 2013) is proportionately smaller than diameter 346 of layer 343 (year 2012), as the total revenue represented by layer 344 ($11,000) is less than the total revenue represented by layer 343 ($12,000). Diameter 345 of layer 344 is proportionately larger than diameter 347 of layer 341 (year 2010), as the total revenue represented by layer 344 ($11,000) is greater than the total revenue represented by layer 341 ($9,500).

Figure 3E:
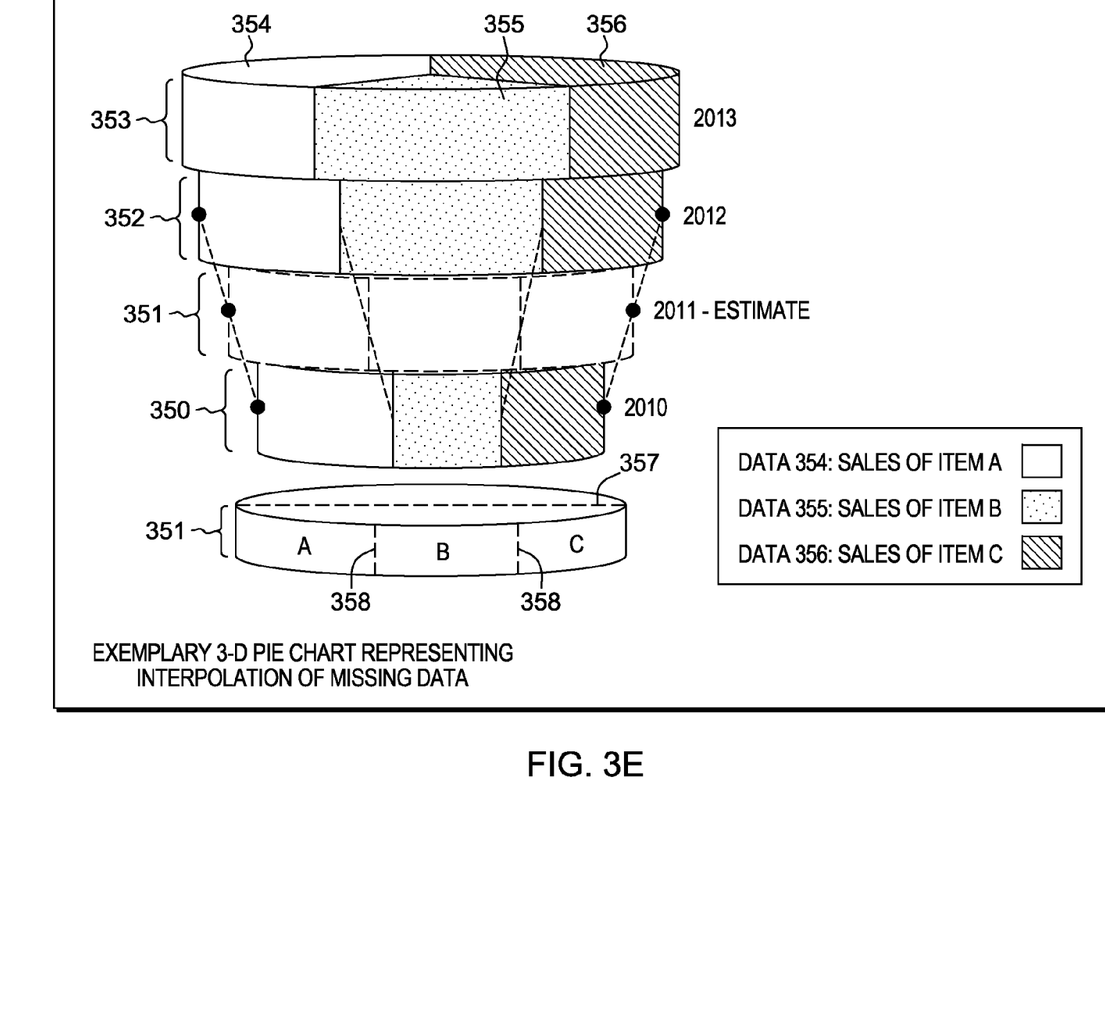
FIG. 3E illustrates an example of a 3-D pie chart representing interpolation of missing data with a variation of the diameter of each layer, in accordance with an embodiment of the present invention.

FIG. 3E illustrates an example of a 3-D pie chart representing interpolation of missing data with a variation of the diameter of each layer, in accordance with an embodiment of the present invention. Interpolation is a method of constructing new data points within the range of a discrete set of known data points. Missing or unknown data, such as time data, may be estimated using an interpolation calculation and input into the 3-D pie chart for visual display.

Data 354, 355, and 356 are each exemplary sets of data, representing the sales of items A, B, and C, respectively, in each of 3-D pie chart layer 350, layer 352, and layer 353, over time. 3-D pie chart layers 350, 352, and 353 are each the same height, and each layer represents the relative, overall sales revenue for the year. 3-D pie chart layer 351 is missing the sales of items A, B, and C data for the year 2011, and is the layer that needs to be interpolated to estimate the diameter of the layer (total sales revenue for the year 2011), as well as the size of each of the slices of missing data 354 (sales of item A), 355 (sales of item B), and 356 (sales of item C).

In the exemplary embodiment, a simple linear interpolation is implemented to estimate the diameter and size of the data of the missing layer between two known layers. For example, as depicted in FIG. 3E, a straight line is drawn connecting the midpoints of: both ends of a diameter of layer 350 and the midpoints of each data slice of layer 350, to each corresponding midpoint of layer 352. The diameter and size of each slice of data of missing layer 351 is estimated using the drawn interpolation lines. For example, diameter 357 and slice lines 358 of layer 351 are estimated using interpolation, as depicted in FIG. 3E, resulting in estimated data slices A, B, and C, representing estimated data 354, 355, and 356, respectively. In other embodiments, any interpolation algorithm is used, for example, polynomial interpolation and one or more of: the diameter, the size of the data slices, and the height, which are estimated using interpolation.

Figure 4:
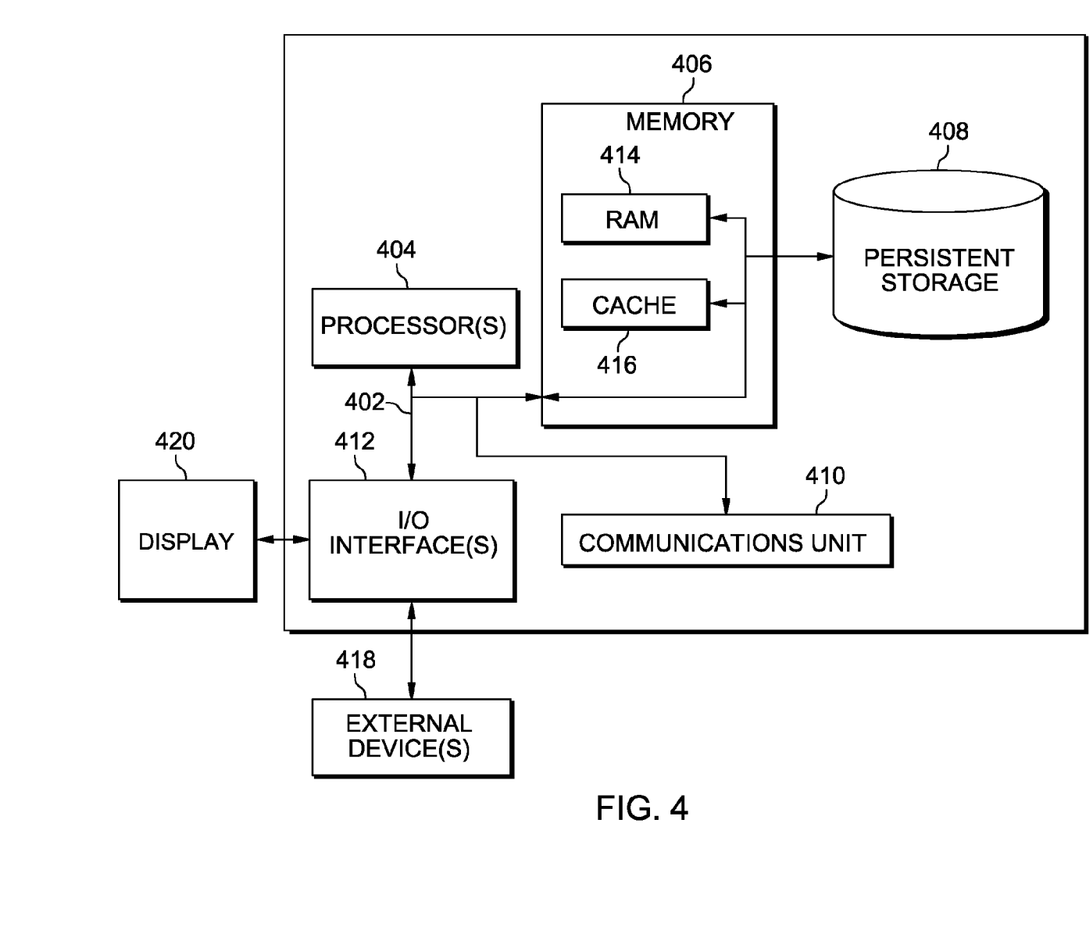
FIG. 4 depicts a block diagram of internal and external components of a data processing system, such as the client computing device of FIG. 1, in accordance with an embodiment of the present invention.

FIG. 4 depicts a block diagram of components of computing device 120, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User interface 122, display program 123, and pie chart generating program 124 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Display program 123 and pie chart generating program 124 may be downloaded to persistent storage 408 through communications unit 410.

I/O interface(s) 412 allows for input and output of data with other devices that may be connected to computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., display program 123 and pie chart generating program 124, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for visualization of big data using three dimensional pie charts, the method comprising:
   receiving, by one or more processors, at least a first set of data, wherein the at least first set of data comprises information detailing one or more subsets of values, wherein each value has an associated time element;
   determining, by the one or more processors, a three dimensional pie chart based on the at least first set of data, wherein the three dimensional pie chart includes a total height comprising at least a first layer coupled to a second layer, and wherein the first layer comprises a first set of wedges, and the second layer comprises a second set of wedges, and wherein determining a height of the at least first layer and the second layer based on the time element further comprises:
      receiving, by the one or more processors, a user input detailing the total height of the three dimensional pie chart, wherein the total height comprises a non-uniform spacing of data in at least one axis;
      determining, by the one or more processors, a height of the first layer based on a first height factor, wherein the first height factor is determined based on the time element, a relative height of the second layer, wherein the height of the first layer is proportional to the relative height of the second layer, and the total height of the three dimensional pie chart;
      determining, by the one or more processors, a height of the second layer based on a second height factor, wherein the second height factor is determined based on the time element, a relative height of the at least first layer, wherein the height of the second layer is proportional to the relative height of the first layer, and the total height of the three dimensional pie chart; and
      wherein at least a relative size of the other set of data between the first and second set of wedges and a relative size of the time element between the at least first layer and second layer are displayed in the same three dimensional pie chart, and wherein determining a three dimensional pie chart based on the at least first set of data further comprises:
      determining, by the one or more processors, a diameter of the at least first layer and the second layer based on the at least first set of data,
      determining, by the one or more processors, a second set of data, associated with the at least first set of data, located between the first and second layers is unknown,
      generating, by the one or more processors, a subset of values associated with the second set of data using linear interpolation; wherein linear interpolation comprises an estimation calculation of the subset of values associated with the second set of data, drawing a straight line connecting each wedge in the first layer to each corresponding wedge of the second layer and the ends of the diameter of the first layer to the corresponding ends of the diameter of the second layer to interpolate a total diameter of the unknown data and a size of each wedge of the unknown data, and
      constructing, by the one or more processors, a third layer in the three dimensional pie chart, the third layer located between the first and second layers and comprising a third set of wedges, wherein a diameter of the third layer and a size of the third set of wedges is determined according to the generated subset of values associated with the second set of data; and
   displaying, by the one or more processors, the three dimensional pie chart, wherein the three dimensional pie chart comprises at least the first layer, the second layer, and the third layer, wherein the first set of wedges and the second set of wedges are based on another set of data different from the at least first set of data and the time element, and wherein the at least first set of data is a diameter of the at least first layer at a given time, the time element is a given time, and the other set of data different from the at least first set of data and the time element is a set of data elements used for the given time.

2. The method of claim 1, wherein the step of determining a diameter of the at least first layer and the second layer based on the at least first set of data, further comprises:
   receiving, by the one or more processors, a user input detailing a maximum diameter for the at least first layer and the second layer of the three dimensional pie chart;
   determining, by the one or more processors, a diameter of the first layer, based on a first diameter factor, wherein the first diameter factor comprises the at least first set of data, a relative diameter of the second layer, wherein the diameter of the first layer is proportional to the relative diameter of the second layer, and the maximum diameter for the at least first layer and the second layer;
   determining, by the one or more processors, a diameter of the second layer based on a second diameter factor, wherein the second diameter factor comprises the at least first set of data, the relative diameter of the at least first layer, wherein the diameter of the second layer is proportional to the relative diameter of the first layer, and the maximum diameter for the at least first layer and the second layer; and
   wherein at least a relative size of the other set of data between the first and second set of wedges, a relative size of the time element between the at least first layer and second layer, and a total size of the at least first set of data between the at least first and second layer are displayed in the same three dimensional pie chart.

3. A computer program product for visualization of big data using three dimensional pie charts, the computer program product comprising:

a non-transitory computer readable storage medium and program instructions stored on the non-transitory computer readable storage medium, the program instructions comprising:

program instructions to receive at least a first set of data, wherein the at least first set of data comprises information detailing one or more subsets of values, and wherein each value has an associated time element;

program instructions to determine a three dimensional pie chart based on the at least first set of data, wherein the three dimensional pie chart includes a total height comprising at least a first layer coupled to a second layer, and wherein the first layer comprises a first set of wedges and the second layer comprises a second set of wedges, and wherein program instructions to determine a height of the at least first layer and the second layer based on the time element further comprise:

program instructions to receive a user input detailing the total height of the three dimensional pie chart, wherein the total height comprises a non-uniform spacing of data in at least one axis;

program instructions to determine a height of the first layer based on a first height factor, wherein the first height factor is determined based on the time element, a relative height of the second layer, wherein the height of the first layer is proportional to the relative height of the second layer, and the total height of the three dimensional pie chart;

program instructions to determine a height of the second layer based on a second height factor, wherein the second height factor is determined based on the time element, a relative height of the at least first layer, wherein the height of the second layer is proportional to the relative height of the first layer, and the total height of the three dimensional pie chart; and wherein at least a relative size of the other set of data between the first and second set of wedges and a relative size of the time element between the at least first layer and second layer are displayed in the same three dimensional pie chart, and wherein determining a three dimensional pie chart based on the at least first set of data further comprises:

program instructions to determine a diameter of the at least first layer and the second layer based on the at least first set of data, program instructions to determine a second set of data, associated with the at least first set of data, located between the first and second layers is unknown, program instructions to generate a subset of values associated with the second set of data using linear interpolation; wherein linear interpolation comprises an estimation calculation of the subset of values associated with the second set of data, drawing a straight line connecting each wedge in the first layer to each corresponding wedge of the second layer and the ends of the diameter of the first layer to the corresponding ends of the diameter of the second layer to interpolate a total diameter of the unknown data and a size of each wedge of the unknown data, and program instructions to construct a third layer in the three dimensional pie chart, the third layer located between the first and second layers and comprising a third set of wedges, wherein a diameter of the third layer and a size of the third set of wedges is determined according to the generated subset of values associated with the second set of data; and program instructions to display the three dimensional pie chart, wherein the three dimensional pie chart comprises at least the first layer, the second layer, and the third layer, wherein the first set of wedges and the second set of wedges are based on another set of data different from the at least first set of data and the time element, and wherein the at least first set of data is a diameter of the at least first layer at a given time, the time element is a given time, and the other set of data different from the at least first set of data and the time element is a set of data elements used for the given time.

4. The computer program product of claim 3, wherein program instructions to determine a diameter of the at least first layer and the second layer based on the at least first set of data, further comprises:

program instructions to receive a user input detailing a maximum diameter for the at least first layer and the second layer of the three dimensional pie chart; program instructions to determine a diameter of the first layer, based on a first diameter factor, wherein the first diameter factor comprises the at least first set of data, a relative diameter of the second layer, wherein the diameter of the first layer is proportional to the relative diameter of the second layer, and the maximum diameter for the at least first layer and the second layer;

program instructions to determine a diameter of the second layer based on a second diameter factor, wherein the second diameter factor comprises the at least first set of data, a relative diameter of the at least first layer, wherein the diameter of the second layer is proportional to the relative diameter of the first layer, and the maximum diameter for the at least first layer and the second layer; and wherein at least a relative size of the other set of data between the first and second set of wedges, a relative size of the time element between the at least first layer and second layer, and a total size of the at least first set of data between the at least first and second layer are displayed in the same three dimensional pie chart.

5. A computer system for visualization of big data using three dimensional pie charts, the computer system comprising:

one or more computer processors;
one or more computer readable storage media;
program instructions stored on the one or more computer readable storage media for execution by at least one of the one or more processors, the program instructions comprising:

program instructions to receive at least a first set of data, wherein the at least first set of data comprises information detailing one or more subsets of values, and wherein each value has an associated time element;

program instructions to determine a three dimensional pie chart based on the at least first set of data, wherein the three dimensional pie chart includes a total height comprising at least a first layer coupled to a second layer, and wherein the first layer comprises a first set of wedges and the second layer comprises a second set of wedges, and wherein program instructions to determine a height of the at least first layer and the second layer based on the time element further comprise:

program instructions to receive a user input detailing the total height of the three dimensional pie chart, wherein the total height comprises a non-uniform spacing of data in at least one axis;

program instructions to determine a height of the first layer based on a first height factor, wherein the first height factor is determined based on the time element, a relative height of the second layer, wherein the height of the first layer is proportional to the relative height of the second layer, and the total height of the three dimensional pie chart;

program instructions to determine a height of the second layer based on a second height factor, wherein the second height factor is determined based on the time element, a relative height of the at least first layer, wherein the height of the second layer is proportional to the relative height of the first layer, and the total height of the three dimensional pie chart; and wherein at least a relative size of the other set of data between the first and second set of wedges and a relative size of the time element between the at least first layer and second layer are displayed in the same three dimensional pie chart, and wherein determining a three dimensional pie chart based on the at least first set of data further comprises:

program instructions to determine a diameter of the at least first layer and the second layer based on the at least first set of data, program instructions to determine a second set of data, associated with the at least first set of data, located between the first and second layers is unknown, program instructions to generate a subset of values associated with the second set of data using linear interpolation; wherein linear interpolation comprises an estimation calculation of the subset of values associated with the second set of data, drawing a straight line connecting each wedge in the first layer to each corresponding wedge of the second layer and the ends of the diameter of the first layer to the corresponding ends of the diameter of the second layer to interpolate a total diameter of the unknown data and a size of each wedge of the unknown data, and program instructions to construct a third layer in the three dimensional pie chart, the third layer located between the first and second layers and comprising a third set of wedges, wherein a diameter of the third layer and a size of the third set of wedges is determined according to the generated subset of values associated with the second set of data; and program instructions to display the three dimensional pie chart, wherein the three dimensional pie chart comprises at least the first layer, the second layer, and the third layer, wherein the first set of wedges and the second set of wedges are based on another set of data different from the at least first set of data and the time element, and wherein the at least first set of data is a diameter of the at least first layer at a given time, the time element is a given time, and the other set of data different from the at least first set of data and the time element is a set of data elements used for the given time.

6. The computer system of claim 5, wherein program instructions to determine a diameter of the at least first layer and the second layer based on the at least first set of data, further comprises:

program instructions to receive a user input detailing a maximum diameter for the at least first layer and the second layer of the three dimensional pie chart;

program instructions to determine a diameter of the first layer, based on a first diameter factor, wherein the first diameter factor comprises the at least first set of data, a relative diameter of the second layer, wherein the diameter of the first layer is proportional to the relative diameter of the second layer, and the maximum diameter for the at least first layer and the second layer;

program instructions to determine a diameter of the second layer based on a second diameter factor, wherein the second diameter factor comprises the at least first set of data, a relative diameter of the at least first layer, wherein the diameter of the second layer is proportional to the relative diameter of the first layer, and the maximum diameter for the at least first layer and the second layer; and wherein at least a relative size of the other set of data between the first and second set of wedges, a relative size of the time element between the at least first layer and second layer, and a total size of the at least first set of data between the at least first and second layer are displayed in the same three dimensional pie chart.

* * * * *